Feb. 18, 1964
K. MACURA
3,121,764
PRODUCTION OF ELASTIC FILAMENTS OF POLYESTERS
CONTAINING ISOCYANATE END GROUPS
Filed Oct. 9, 1962
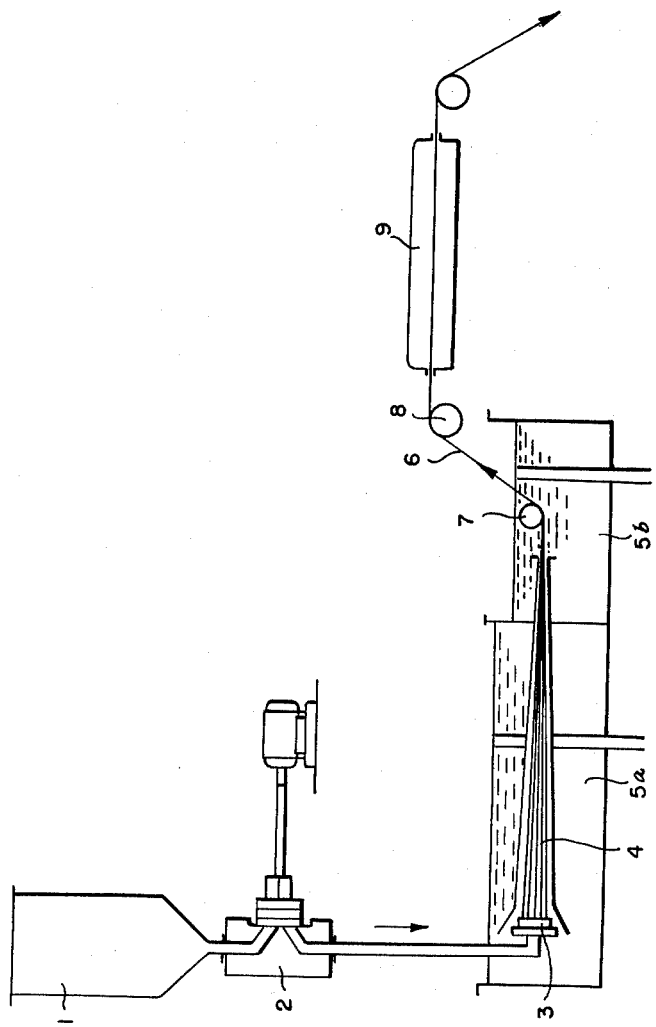
INVENTOR:
KARL MACURA.
BY
ATT'YS

United States Patent Office 3,121,764
Patented Feb. 18, 1964

3,121,764
PRODUCTION OF ELASTIC FILAMENTS OF POLYESTERS CONTAINING ISOCYANATE END GROUPS
Karl Macura, Klingenberg, Germany, assignor to Vereinigte Glanzstoff-Fabriken AG, Wuppertal-Elberfeld, Germany
Filed Oct. 9, 1962, Ser. No. 229,462
Claims priority, application Germany Oct. 12, 1961
8 Claims. (Cl. 264—181)

The invention, in general, relates to production of elastic filaments of polyesters having isocyanate end groups.

It is known that for the production of synthetic polymers with elastic properties the development of cross-linked molecules is necessary. For such a molecular structure linear, isocyanate-end-group containing polyesters are especially suitable. Such polyesters are obtained when polyesters with free hydroxyl end groups are converted with an excess of a diisocyanate. Urethane linkages are formed in this reaction. The products arising in this reaction are linear and contain free isocyanate groups at the chain ends. They can, in general, be cross-linked in a known manner by water, polyamines or glycols. This cross-linking is carried out by bringing the polymer containing isocyanate end groups into reaction with one of the above mentioned compounds at a higher temperature.

The urethane elastomers obtained show, depending on the type of dicarboxylic acids and glycols used for the production of the polyester, on the one hand, and of the diisocyanates, on the other hand, more or less specific elastic properties. These elastomers are largely used for the production of sheets, pressed bodies, etc. There are also processes known, however, by which filaments with elastic properties can be produced from polyesters containing isocyanate end groups.

For further description of the diisocyanate-modified polyesters useful in the practice of this invention, reference is made to U.S. Patent Nos. 2,511,544; 2,620,516; 2,621,166; 2,625,531; and 2,625,532. See also, Modern Plastics, 31, No. 2, 232, 234 (1953); Angew. Chem., 62, 57–66 (1950); Rubber Chem. and Tech., 23, 812–35 (1950); Proc. 2nd Rubber Technol. Conf. (London), 61–68 (1948); Kunstoffe, 41, 13–19 (1951); Angew. Chem., 64, 523–31 (1952); and Ind. Eng. Chem., 45, 2538–42 (1953).

A process is known, for example, according to which a polymer of the general formula

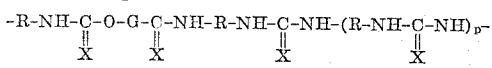

in which R is a divalent aromatic radical, X oxygen or sulfur and G a polyester residue, is spun into elastic filaments. The polymer, which is obtained, for example, from a polyester of adipic acid and ethylene glycol and a diisocyanate, such as 4,4'-diphenyl methane diisocyanate, is dissolved in a suitable solvent. The solution is spun after addition of a cross-linking agent. The thread formation and solidification is accomplished by evaporation of the solvent or by immersion in a suitable precipitating bath. The production of a spinning solution which contains both the polyester containing isocyanate end groups and also the diamine must be carried out under special precautionary measures. Thus, for example, the diamine on the one hand and the polymer on the other hand must be brought into solution, and the solutions must be combined at low temperatures. Further, the addition of the diamine solution must be made in portions at precisely determined intervals of time, since otherwise it is not possible to achieve a homogeneous spinning solution.

This process can be carried out only in the scope of laboratory experiments, because with larger amounts the homogeneity of the spinning solution cannot, in practice, be obtained. Even with diluted solutions the subsequent spinning process is made very difficult, and, under some circumstances, even impossible. In the spinning of diluted solutions which contain, for example, 60% solvent, filaments are formed which can be solidified in the precipitation bath only with difficulty. The coagulated filaments are unusable for textile manufacture.

It is further known how to spin an isocyanate-end-group-containing polyester which is produced by reaction of a polyester of 2,2-dimethyl-1,3-propane-diol and sebacic acid with p,p'-diphenyl-methane-diisocyanate into an ethylene diamine bath. A product produced in this manner is not usable without further treatment. Aside from this fact, the use of an ethylene-diamine bath is not suitable for the execution in practice of a technological process.

It was now found that elastic filaments with very good properties can be produced from isocyanate-end-group-containing polyesters which are produced in a known manner by reaction of polyesters containing hydroxyl end groups with diisocyanates in a suitable solvent, if there is added to the solution of the polyester containing isocyanate end groups 1–5% by weight, based on said polyester with isocyanate end groups, of a fluoroalkyl ester of polyfunctional aromatic acid, or polyfunctional alicyclic carboxylic acid. The solution is concentrated to a concentration of 70–95% and then spun into a water bath flowing with the filament. The water bath has a temperature of 10–50° C. A concentration of at least 10% alkylene polyamine is maintained in the bath. The spun filaments are drawn out of the bath without delay and conducted through a saturated steam atmosphere, in which a stretching and conversion into the elastic state takes place. The filaments are subjected, for stabilization, to a hot-air treatment at temperatures from 110–200° C. The stretching amounts to 250% to 600%, based on the filament length prior to stretching.

The polyester containing isocyanate end groups can be produced from the polyesters and diisocyanates known for the manufacture of elastomers. Especially suitable are the reaction products from a polyethylene glycol-adipic acid polyester and p-phenylene- or 4,4'-diphenyl-methane-diisocyanate. The reaction can be carried out in the solvents normally used, such as dimethylformamide, dimethylacetamide, dimethylsulfoxide, chlorobenzene, dichlorobenzene, acetone or their mixtures.

As fluoroalkyl esters, pyromellitic acid or camphoric acid fluoroalkyl esters are suitable.

In the drawing:

The drawing is a schematic illustration of apparatus which can be used in the practice of the invention.

The process is expediently carried out in the manner apparent from the schematic representation. From the vessel 1, the spinning mass is conveyed by means of a pump 2 to the spinning nozzle 3, which is arranged inside a flow tube 4. This flow tube leads horizontally or nearly horizontally through two precipitation bath tanks 5a and 5b, of which the latter has a somewhat lower liquid level, so that a flow of the bath liquid is accomplished through the flow tube. The filaments 2 are diverted over two rollers or godets 7 and 8 and drawn through a saturated steam chamber 9. At the end of this saturated steam zone, the filaments are either directly spooled and then, in wound state, subjected to the action of the hot air, or, after the leaving of the saturated steam zone they are continuously conducted through a hot-air treatment zone. If need be, the filaments can be drawn, before or immediately after the hot-air treatment, through a water bath which has a temperature of about 90° C.

The process is especially advantageous because, with maintenance of the conditions according to the invention, it is possible to produce and to spin completely homogeneous spinning solutions with high concentration. The spinning process runs smoothly, since the filament formation takes place quickly. Since the spinning bath has to absorb only relatively small amounts of solvent it is usable for a long time. Likewise, the low amine concentration of the spinning bath is of advantage.

The process will be understood further with the aid of the following examples.

Example 1

Six hundred grams of a polyester of adipic acid and ethylene glycol, with a hydroxyl content of 1.92%, an acid number of 1.2 mg. KOH/g. polyester and a water content of 0.01%, and also 180 grams 4,4'-diphenyl methane diisocyanate are dissolved in 100 cc. dimethyl formamide. To the solution there is added 20 cc. pyromellitic acid fluoroalkyl etser and the solution is homogenized by heating to 130° C. under agitation, introduction of nitrogen and exclusion of atmospheric moisture. Thereupon, 30 cc. dimethyl formamide are evaporated under vacuum, and the spinning mass is cooled to room temperature. The completely homogeneous spinning mass is extruded through a 24-hole nozzle (hole diameter 125μ). The nozzle is arranged inside a flow tube, in which the bath liquid flows in filament-flow direction at a speed of 30 meters per minute. The flow is achieved by a difference of 12 mm. in levels of two successively arranged tanks. As spinning bath water is used, i.e., a 40% by weight aqueous solution of ethylene diamine. The bath temperature is 25° C. The filaments are solidified in the spinning bath to such an extent that they can be drawn off from the bath under stretching tension and after deflection over a godet can be conducted into the following saturated steam zone. The temperature of this zone amounts to 95° C., the drawing-off speed to 115 m./min. The filaments are stretched to an extent of about 350%. The filaments are spooled and treated for ten minutes with hot air at 130° C. The filaments have a denier of 260 den., a breaking strength of 0.59 g./den., a stretch of 411% and an elastic recovery of 98%.

Example 2

Six hundred grams of a polyester as described in Example 1 are dissolved together with 180 g. 4,4'-diphenyl-methane-diisocyanate at 80–90° C. in 100 cc. chlorobenzene. There are then added 20 cc. camphoric acid fluoroalkyl ester, and the solution is homogenized at 130° C. for about 1¼ hours with agitation under a blanket of nitrogen and with exclusion of atmospheric moisture. Then, under vacuum, 80 cc. of chlorobenzene are drawn off and the spinning mass is cooled in the course of an hour to room temperature. Making use of the apparatus described in Example 1, spinning is carried out into a 50% aqueous ethylene diamine solution at 25° C. The flow speed of the bath is set at about 28 m./min. The filaments drawn off from the bath are conducted through a saturated steam zone (95° C.) and wound with a draw-off of 100 m./min. The stretching amounts to about 300%. There follows a treatment with hot air of 130° C. The threads have a denier of 259.2 den., a breaking strength of 0.69 g./den. and a stretch of 580%. The elastic recovery amounts to 97%.

Example 3

Six hundred grams of a polyester which is produced by condensation of adipic acid and ethylene glycol, has a hydroxyl content of 2.13%, an acid number of 1.0 mg. KOH/g. of polymer and a water content of 0.01% are dissolved together with 4,4'-diphenyl methane diisocyanate at 90° C. in 100 cc. dimethyl formamide. After addition of 20 cc. camphoric acid fluoroalkyl ester, the solution is agitated at 120° C. for 2 hours under a blanket of nitrogen and with exclusion of atmospheric moisture. Then 50 cc. dimethyl formamide are distilled off, and the spinning mass is allowed, in the course of an hour, to cool to room temperature. Spinning is then carried out as in Example 2, the flow speed of the precipitation bath being regulated to 24 m./min. After the emergence from the saturated steam zone, the filaments are spooled with a drawing-off speed of 92 m./min. The stretching of the filaments amounts to about 330%. The filaments have a denier of 340 den., a breaking strength of 0.6 g./den. and a stretch of 563%.

After a treatment of the filaments with hot air at 130° C. a denier is measured of 466 den., a breaking strength of 0.55 g./den. and a stretch of 624%. The elastic recovery amounts to 97%.

Example 4

Six hundred grams of a polyester of adipic acid and ethylene glycol with a hydroxyl content of 1.64%, an acid number of 1.2 mg. KOH/g. of polymer and a water content of 0.02% are dissolved with 180 g. 4,4'-diphenyl methane-diisocyanate at 90° C. in 100 cc. dimethyl formamide. After addition of 10 cc. camphoric acid fluoroalkyl ester, the solution is homogenized as described in the examples above at 130° C. After distilling off of 60 cc. dimethyl formamide, the spinning mass is spun according to the data of the above examples into a 50% aqueous ethylene diamine bath and further treated. The filaments, after emergence from the saturated steam zone, are directly conducted through a hot-air zone, in which a temperature of 180° C. prevails. The drawing-off speed amounts to 95 m./min. The filaments are stretched to an extent of 350%. The filaments have a denier of 445 den., a breaking strength of 0.37 g./den. and a stretch of 442.5%. The elastic recovery amounts to 98%.

Example 5

Six hundred grams of a polyester of adipic acid and ethylene glycol with a hydroxyl content of 1.64%, an acid number of 0.9 mg. KOH/g. of polymer and a water content of 0.01% are dissolved together with 115 g. p-phenylene diisocyanate in 100 cc. chlorobenzene. Then 20 cc. pyromellitic acid fluoroalkyl ester are added, and the solution is homogenized under agitation at 130° C. Forty cc. chlorobenzene are distilled off. The mass is allowed to cool to room temperature and is spun into a 40% aqueous ethylene diamine bath whose flow speed amounts to 28 meters/min. After passing the filaments through a saturated steam zone at 95° C., they are spooled at a rate of 95 meters/min. and are subjected on the spools to a treatment with hot air of 130° C. The stretching amounts to about 280%. The filaments have a denier of 445.5 den., a breaking strength of 0.37 g./den. and a stretch of 442.5%. The elastic recovery amounts to 96%.

In the foregoing examples, the fluoroalkylesters were

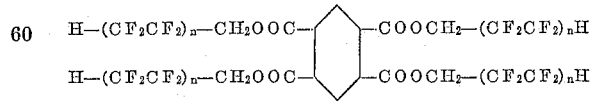

or

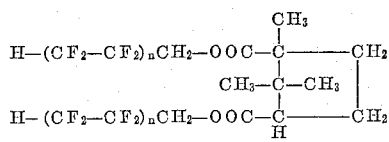

werein $n$ is 4 to 12.

These compounds are produced by esterification of pyromellitic acid or camphoric acid with fluoroalkyl alcohols as they are described in U.S. Patent No. 2,559,628.

The aqueous polyamine bath may contain about 10–

60% by weight of ethylene diamine, or a corresponding amount of other water-soluble alkylene polyamine such as propylene diamine-1,2, diethylene triamine, triethylene tetramine, tetraethylene pentamine, dipropylene triamine-1,2, dipropylene triamine-1,3, and the like. The alkylene polyamines have the general formula $$H_2N—(C_nH_{2n}NH—)_xH$$

where $n$ is 2 or 3 and $x$ is 1, 2, 3 or 4.

The polyesters used in the invention preferably are polyesters of adipic acid and ethylene glycol. However, polyester polymers of other acids of the formula $$HOOC(CH_2)_xCOOH$$

where $x$ is 2–8, e.g., succinic acid, sebacic acid, etc., and ethylene glycol or other alkylene glycol having 3–6 carbons, e.g., 1,3-propane diol, 2,2-dimethyl-1,3-propane diol, 1,4-butane diol, 1,6-hexane diol, etc., may be used in the invention and substituted for polyethylene adipate in the foregoing examples. The polyesters have molecular weights in the range of from 1000 to 3000, especially about 2000.

The diisocyanates preferably are diisocyanates on phenylene or diphenyl alkane nuclei. The preferred compounds are p-phenylene diisocyanate and 4,4'-diphenyl methane diisocyanate. Other diisocyanates which may be used include p-tolylene diisocyanate, 4,4'-diphenyl ethane diisocyanate, 1,3,5-trimethyl-phenyl-2,6-diisocyanate.

The invention is hereby claimed as follows:

1. In a process for production of elastic filaments, the steps of forming a spinning solution which comprise incorporating into a solution in an organic solvent of a polyester polymer of an alkane dicarboxylic acid and an alkylene glycol, said polymer having isocyanate end groups, 1–5% by weight, based on said polyester polymer with isocyanate terminal groups, of a fluoroalkyl ester of a polycarboxy acid selected from the group consisting of camphoric acid and pyromellitic acid, said fluoroalkyl group of said ester having the formula $$—CH_2(CF_2CF_2)_n—H$$

wherein $n$ is a whole number in the range of 4–12, and concentrating said solution by evaporation of said solvent to a polyester polymer concentration of 70–95%.

2. A process for the production of elastic filaments which comprises incorporating into a solution in an organic solvent of a polyester polymer having isocyanate terminal groups 1–5% by weight, based on said polyester with isocyanate end groups, of a fluoroalkyl ester of a polycarboxy acid selected from the group consisting of camphoric acid and pyromellitic acid, concentrating said solution by evaporation of said solvent to a polyester concentration of 70–95%, spinning said concentrated solution into an aqueous bath to form filaments, drawing said filaments through said aqueous bath flowing concurrently with the direction of movement of said filaments in said bath, said bath having a temperature of 10–50° C. and containing at least 10% by weight of an alkylene polyamine, conducting said filaments under tension from said bath through a saturated steam zone and stretching said filaments herein, and thereafter stabilizing said filaments by contacting them with air at a temperature of 110–200° C.

3. A process for the production of elastic filaments which comprises incorporating into a solution in an organic solvent of a polyethylene adipate polymer having isocyanate terminal groups 1–5% by weight based on said polyethylene adipate polymer with isocyanate end groups, of a fluoroalkyl ester of camphoric acid, concentrating said solution by evaporation of said solvent to a polyethylene adipate polymer concentration of 70–95%, spinning said concentrated solution into an aqueous bath to form filaments, drawing said filaments through said aqueous bath flowing concurrently with the direction of movement of said filaments in said bath, said bath having a temperature of 10–50° C. and containing at least 10% by weight of ethylene diamine, conducting said filaments under tension from said bath through a saturated steam zone and stretching said filaments therein, and thereafter stabilizing said filaments by contacting them with air at a temperature of 110–200° C.

4. A process for the production of elastic filaments which comprises incorporating into a solution in an organic solvent of a polyethylene adipate polymer having isocyanate terminal groups 1–5% by weight, based on said polyethylene adipate polymer with isocyanate and groups, of a fluoroalkyl ester of pyromellitic acid, concentrating said solution by evaporation of said solvent to a polyethylene adipate polymer concentration of 70–95%, spinning said concentrated solution into an aqueous bath to form filaments, drawing said filaments through said aqueous bath flowing concurrently with the direction of movement of said filaments in said bath, said bath having a temperature of 10–50° C. and containing at least 10% by weight of ethylene diamine, conducting said filaments under tension from said bath through a saturated steam zone and stretching said filaments therein, and thereafter stabilizing said filaments by contacting them with air at a temperature of 110–200° C.

5. A process as claimed in claim 3 wherein said isocyanate terminal groups are isocyanate groups of a diisocyanate selected from the group consisting of p-phenylene diisocyanate and 4,4'-diphenyl methane diisocyanate, which diisocyanate is terminally adducted on said polyethylene adipate polymer.

6. A process as claimed in claim 4 wherein said isocyanate terminal groups are isocyanate groups of a diisocyanate selected from the group consisting of p-phenylene diisocyanate and 4,4'-diphenyl methane diisocyanate, which diisocyanate is terminally adducted on said polyethylene adipate polymer.

7. A process as claimed in claim 3 wherein said fluoroalkyl group of said ester has the structural formula $$—CH_2—(CF_2CF_2)_nH$$

wherein $n$ is a whole number in the range of 4 to 12.

8. A process as claimed in claim 4 wherein said fluoroalkyl group of said ester has the structural formula $$—CH_2—(CF_2CF_2)_nH$$

wherein $n$ is a whole number in the range of 4 to 12.

References Cited in the file of this patent

UNITED STATES PATENTS

| | | |
|---|---|---|
| 3,009,762 | Kohrn et al. | Nov. 21, 1961 |
| 3,009,764 | Urs | Nov. 21, 1961 |
| 3,009,765 | Slovin | Nov. 21, 1961 |

UNITED STATES PATENT OFFICE
CERTIFICATE OF CORRECTION

Patent No. 3,121,764            February 18, 1964

Karl Macura

It is hereby certified that error appears in the above numbered patent requiring correction and that the said Letters Patent should read as corrected below.

Column 6, lines 22 and 23, for "and groups" read -- end groups --.

Signed and sealed this 21st day of July 1964.

(SEAL)

Attest:

ESTON G. JOHNSON            EDWARD J. BRENNER
Attesting Officer            Commissioner of Patents